Dec. 23, 1952             E. V. SUNDT             2,622,865
ACCELERATION RESPONSIVE DEVICE, INCLUDING MEANS
FOR INDICATING SPEED AND/OR DISTANCE
Filed July 9, 1947                               2 SHEETS—SHEET 1
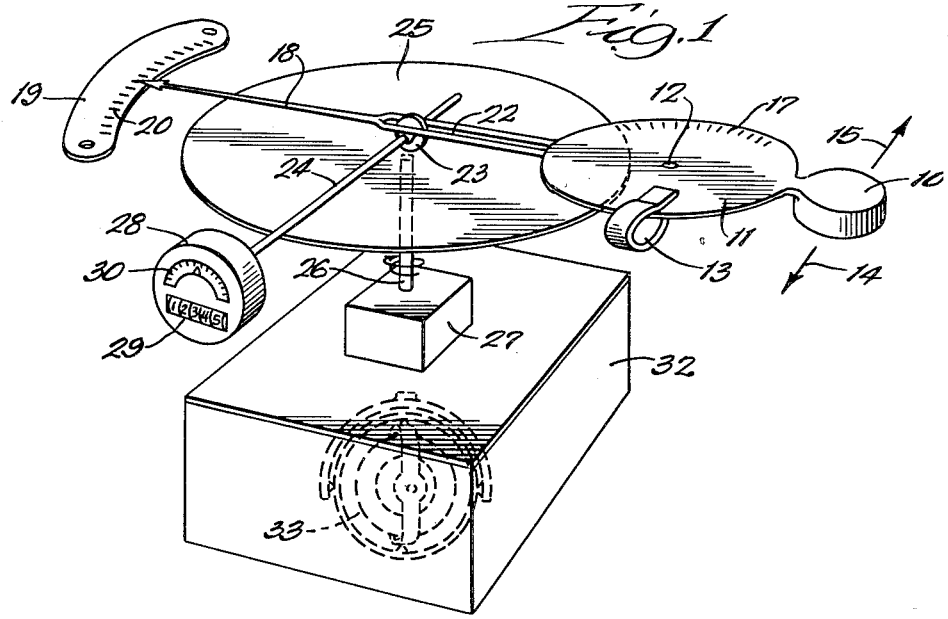
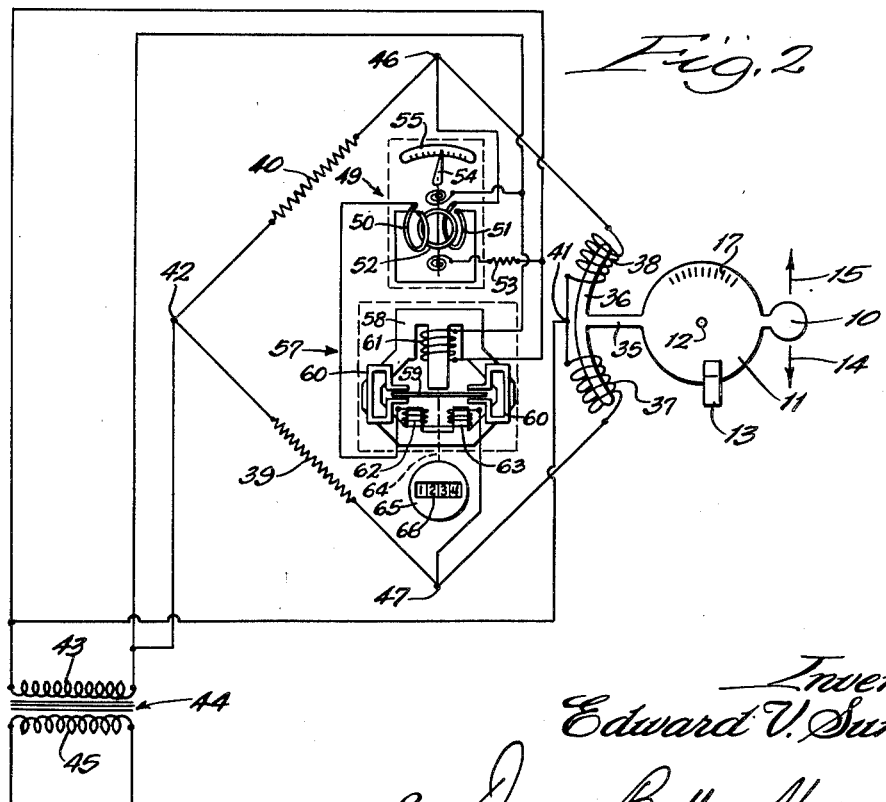
Inventor:
Edward V. Sundt,
By Dawson, Booth & Spangenberg,
Attorneys

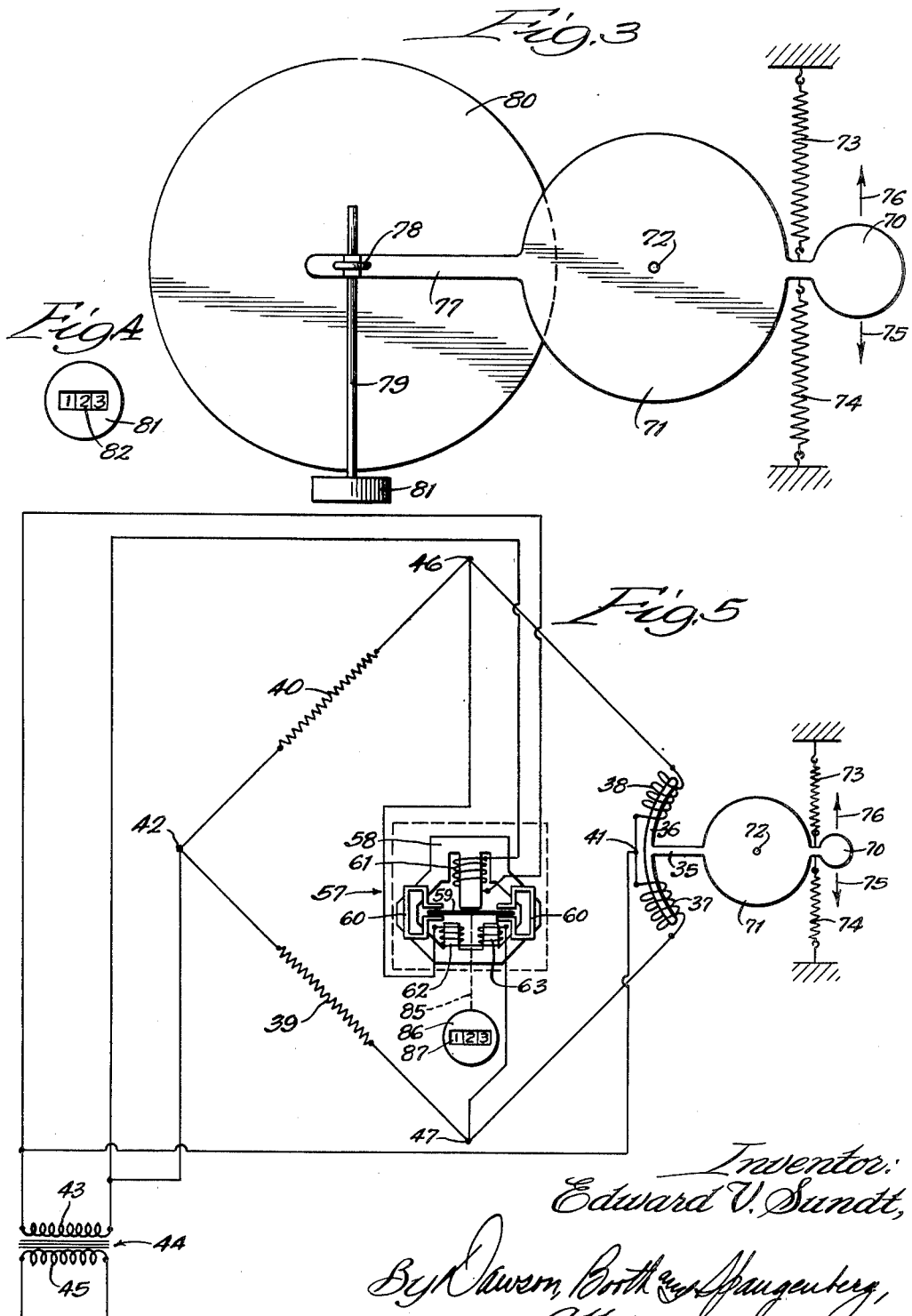

Patented Dec. 23, 1952

2,622,865

UNITED STATES PATENT OFFICE 2,622,865

ACCELERATION RESPONSIVE DEVICE, INCLUDING MEANS FOR INDICATING SPEED AND/OR DISTANCE

Edward V. Sundt, Chicago, Ill.

Application July 9, 1947, Serial No. 759,747

7 Claims. (Cl. 264—1)

This invention relates to speed and/or distance indicators.

The principal object of this invention is to provide an improved speed and/or distance indicator responsive solely to acceleration and deceleration and time for obtaining indications of speed and/or distance. It has particular utility in indicating speed and/or distance traveled by aircraft, projectiles, ships and the like for the indications are entirely independent of the effects of wind, current, yaw and the like which materially affect presently used indicators. For example, the indicator of this invention will provide a direct indication of actual speed of an aircraft regardless of head wind, tail wind or cross wind for it is in no way dependent upon air speed but is dependent upon acceleration and deceleration and time.

In carrying out this object of the invention, acceleration and deceleration and time are integrated to obtain a reading of speed, and, in turn, speed may be again integrated with time to obtain a reading of distance traveled. Various apparatuses may be utilized for detecting acceleration and deceleration and for integrating the same with respect to time to obtain speed and distance indications.

In accordance with the preferred forms of this invention there is utilized an unbiased mass adapted freely to come to rest in a plurality of positions and which is movable in one direction or the other only upon acceleration or deceleration and means, such as a magnetic brake, are provided for permitting movement of said mass from any of its positions to others of its positions during acceleration or deceleration and at a rate dependent only upon the amount of acceleration or deceleration, whereby acceleration or deceleration is integrated with respect to time to position the mass in accordance with speed. The mass may control an indicator for indicating speed. The speed indication may in turn be integrated with respect to time to obtain distance by a mechanical or electrical integrator. The integrator may control an indicator for indicating distance.

In accordance with another form of this invention, there is utilized a mass which is biased to a neutral position and which is movable in one direction or the other upon acceleration or deceleration to an extent dependent upon the amount of acceleration or deceleration. A time integrator, either mechanical or electrical, is controlled by the mass for integrating acceleration and deceleration and time into speed. An indicator controlled by the time integrator may be utilized for indicating speed. Here again the speed indication may be further integrated with time to obtain an indication of distance.

Other objects and advantages will become apparent to those skilled in the art upon reference to the accompanying specification, claims and drawings, in which—

Fig. 1 is a perspective view of one form of the invention utilizing a mechanical integrator for indicating distance;

Fig. 2 is a diagrammatic illustration of another form of the invention utilizing an electrical indicator for indicating speed and an electrical integrator for indicating distance;

Fig. 3 is a plan view of another form of the invention utilizing a mechanical integrator for indicating speed;

Fig. 4 is an elevational view of the indicator of Fig. 3;

Fig. 5 is a diagrammatic illustration of another form of the invention utilizing an electrical integrator for indicating speed.

Referring first to Fig. 1, the speed and/or distance indicator includes a weight 10 carried by a metal disc 11 rotatably mounted at 12. Rotation of the disc 11 about its axis 12 is retarded by a magnetic brake 13. Upon acceleration, the weight 10 swings rearwardly about the axis 12 in the direction indicated by the arrow 14 and upon deceleration the weight swings forwardly as indicated by the arrow 15. The movement of the weight in one direction or the other is retarded by the magnetic brake 13. The rate of movement of the weight 10 in one direction or the other against the retarding action of the magnetic brake 13 is dependent upon the amount of acceleration or deceleration. Thus, when there is no acceleration or deceleration, that is when the vehicle carrying the indicator is standing still or is moving at a constant speed, the weight 10 remains stationary.

When, however, the vehicle accelerates or decelerates, the weight 10 moves in one direction or the other and the rate of such movement against the retarding action of the magnetic brake is dependent upon the amount of such acceleration or deceleration. Thus acceleration and deceleration are integrated with respect to time and the weight 10 assumes a position corresponding to the instantaneous speed of the vehicle.

The disc 11 may be provided with indicia 17 for indicating speed, and, if desired, it may also be provided with a pointer 18 cooperating with a scale plate 19 having indicia 20 for indicating speed.

In operation when the vehicle is stationary the weight 10 assumes a mid-position as shown in Fig. 1 and the indicators indicate zero speed. When the vehicle moves forward it accelerates and the weight 10 moves rearwardly in the direction indicated by the arrow 14. The rate of such rearward movement is dependent upon the amount of acceleration. When the acceleration has ceased so that the vehicle is traveling at a constant speed, the rearward movement of the weight 10 is arrested and it assumes a position depending upon the speed attained following acceleration. If, after the vehicle has attained a constant speed it is again accelerated, the weight 10 will move rearwardly and assume a new position dependent upon the new speed following the second acceleration.

When the vehicle is decelerated in the slowing down process the weight 10 moves forwardly in the direction indicated by the arrow 15 and the rate of such forward movement, of course, depends upon the amount of deceleration. When this deceleration has terminated and the vehicle is operating at a constant slower speed, the weight 10 assumes a new position corresponding to the new speed.

When the vehicle is stopped it is decelerated in slowing down and the rate of movement of the weight 10 depends upon the amount of deceleration and when the vehicle is stopped the weight 10 assumes the mid-position shown in Fig. 1 and indicates zero speed. During any forward motion of the vehicle then the position of the weight away from the neutral position provides a direct indication of the instantaneous speed at all times regardless of the number of and the amount of acceleration and deceleration. If the vehicle is operated in the reverse direction the speed indicator operates in the same fashion but in the reverse direction.

There is thus provided a speed indicator which is responsive solely to acceleration, deceleration and time, wherein the effects of acceleration and deceleration and time are integrated for the purpose of providing a speed indication.

The pointer 18 may be bifurcated at 22 for receiving a wheel 23 splined on a shaft 24. The wheel frictionally engages a rotating disc 25 driven by a shaft 26 which in turn is driven at a constant speed by a synchronous motor 27. The pointer 18 positions the wheel 23 radially on the rotating disc 25 in accordance with speed. When the wheel 23 is in the mid-position, as illustrated in Fig. 1, it is not rotated but as the wheel is positioned toward the periphery of the disc 25, the wheel is rotated at a speed depending upon the amount of displacement thereof. Thus, the greater the speed the greater the displacement and the greater the speed of rotation of the wheel 23. The wheel 23 rotates the shaft 24, which, in turn, operates an indicator 28. The indicator 28 includes a register 29 calibrated in distance. The wheel and disc assembly form a mechanical integrator for integrating speed with respect to time so that the register 29, driven by the shaft 24, provides an indication of distance travel. If desired the indicator 28 may be provided with a magnetic clutch differentiator as in a conventional speedometer for providing a further indication of speed, which speed indication is indicated by the pointer and dial arrangement 30. Thus, in the indicator of Fig. 1 not only are acceleration and deceleration time integrated to provide a speed indication but also the speed indication is integrated with respect to time to provide a distance indication.

When the indicator is utilized in aircraft and the like it is preferably positioned by a level platform mechanism 32 having a gyro 33 for maintaining the parts horizontal so that the weight 10 will not be affected by gravity and so that the horizontal speed of the aircraft will at all times be indicated. The level platform and gyro assembly 32 and 33 may be utilized for continuously pointing the indicator in the desired direction so that the actual speed of the aircraft toward the desired point will at all times be indicated.

The form of the invention illustrated in Fig. 2 is basically the same as that illustrated in Fig. 1 and like reference characters for like parts have been utilized. However, in Fig. 2 an electrical indicator for indicating speed is utilized in lieu of the pointer 18 of Fig. 1 and an electrical integrator is utilized for indicating distance in lieu of the mechanical integrator of Fig. 1. The weight 10 in Fig. 2, instead of operating the pointer 18 operates an arm 35 carrying an armature 36 operable in inductance coils 37 and 38. These inductance coils are included in two arms of a bridge circuit, the other two arms containing resistances 39 and 40. The bridge circuit is powered with alternating current at fixed frequency at points 41 and 42 by a secondary 43 of a transformer 44 having a primary 45 connected to a suitable source of alternating voltage. There is thus provided an A. C. bridge system.

The balance terminals of the bridge circuit are indicated at 46 and 47 and a speed indicator generally designated at 49 and a distance indicator generally designated at 57 are connected therebetween. The speed indicator 49 includes a pair of stationary coils 50 and 51 connected in series between the balance terminals 46 and 47 and also a movable coil 52 connected through flexible leads and a protective resistance 53 across the secondary 43 of the transformer 44. The indicator, therefore, comprises what may be termed an A. C. galvanometer for operating a pointer 54 with respect to a scale 55 for the purpose of indicating speed.

When the vehicle is stationary the weight 10 is in the mid-position shown in Fig. 2, the A. C. bridge is balanced and the pointer 54 of the indicator 49 indicates zero speed. When the vehicle is in motion in one direction, the weight 10 assumes a position corresponding to the instantaneous speed in that direction and the A. C. bridge is unbalanced a corresponding amount whereby the pointer 54 of the A. C. galvanometer is deflected a corresponding amount to give an instantaneous reading of speed. Unbalance of the bridge causes the A. C. current through the coils 50 and 51 to be out of phase with the current through the movable coil 52 whereby the galvanometer is deflected in the corresponding direction and the amount of deflection is dependent upon the amplitude of the out of phase current. Thus the greater the speed, the greater the amplitude of the out of phase current and hence the greater the deflection of the galvanometer and the greater the indication of speed.

If the vehicle is operated in the opposite direction the weight 10 moves in the opposite direction an amount corresponding to the instantaneous speed and the bridge circuit is unbalanced in the opposite direction to provide a current of opposite phase to the movable coils 50 and 51 for deflecting the galvanometer in the opposite direction to indicate the amount of the reverse speed.

The electrical integrator 57 for indicating distance includes a core structure 58 associated with a rotatable disc 59, the rotation of which is retarded by magnets 60. One of the pole pieces of the core structure 58 is provided with a coil 61 connected across the secondary 43 of the transformer 44 and the other pole pieces are provided with coils 62 and 63 connected in series between the balance terminals 46 and 47. The coils 61, 62 and 63 control the direction and speed of rotation of the disc 59. When the bridge circuit is balanced the disc 59 is stationary. When the bridge circuit is unbalanced in one direction, the current through the coils 62 and 63 is out of phase with the current through the coil 61 causing the disc 59 to rotate in one direction. The amplitude of the out of phase current depends upon the extent of unbalance and hence the disc rotates at a rate corresponding to the extent of bridge unbalance. When the bridge circuit is unbalanced in the opposite direction the opposite action occurs and the disc 59 rotates in the opposite direction at a rate dependent upon the extent of unbalance.

When the vehicle is stationary the disc 59 is stationary. When the vehicle is in motion in one direction the disc 59 is rotated at a rate in one direction corresponding to the instantaneous speed. When the vehicle is in motion in the opposite direction the disc 59 is rotated in the opposite direction at a rate corresponding to the reverse instantaneous speed. There is thus provided an integrator for integrating speed with respect to time for obtaining an indication of distance. In this respect the disc 59 of the integrator operates through a suitable mechanism 64 for operating an indicator 65 having a register 66 calibrated in distance.

The form of the invention illustrated in Fig. 3 is basically different from that illustrated in Fig. 1. In the Fig. 3 form a weight 70 is carried by a disc 71 pivoted at 72. Springs 73 and 74 bias the weight 70 to the mid-position shown in Fig. 3. Upon forward acceleration of the vehicle the weight 75 is moved rearwardly in the direction indicated by the arrow 75 against the action of the springs 73 and 74 and the amount of such rearward movement of the weight 70 is directly dependent upon the amount of forward acceleration. Upon the occurrence of forward deceleration, the weight 70 moves forward in the direction indicated by the arrow 76 against the action of the springs 73 and 74 and the amount of such forward movement of the weight 70 is directly dependent upon the amount of forward deceleration. Thus when the vehicle is stationary or is operating at a constant speed, the weight 70 assumes the neutral position shown.

Upon forward acceleration of the vehicle the weight 70 moves rearwardly in the direction indicated by the arrow 75 and upon forward deceleration the weight moves forwardly in the direction indicated by the arrow 76. Thus the instantaneous position of the weight 70 is directly dependent upon acceleration or deceleration since no time component is introduced at this point in the apparatus of Fig. 3 as was done in the apparatus of Fig. 1.

The disc 71 carries an arm 77 provided with a wheel 78 splined on a shaft 79. The arm 77 is adapted to radially position the wheel 78 along a rotating disc 80 corresponding to the disc 25 of Fig. 1. The wheel 78 splined to the shaft 79 rotates the shaft in one direction or the other, depending upon the direction of displacement of the wheel 78 with respect to the rotating disc 80 and the speed of rotation of the wheel 78 and shaft 79 is directly dependent upon the extent of departure of the wheel 78 from the mid-position on the disc 80.

The wheel 78 and disc 80 provide a mechanical integrator for rotating the shaft 79 so that the position of the weight 70 which is dependent upon acceleration or deceleration is integrated with respect to time to provide an indication of speed. The shaft 79 operates an indicator 81 having a register 82 calibrated in speed. In operation when the vehicle is stationary the weight 70 assumes the mid-position and no rotation is imparted to the wheel 78 and hence the register of the indicator 81 indicates zero speed. When forward motion is imparted to the vehicle acceleration takes place and the weight 70 moves rearwardly in the direction indicated by the arrow 75 to displace the wheel 78 from the center of the disc 80 and as long as acceleration takes place the wheel 78 is rotated and the speed of rotation is dependent upon the amount of acceleration. When the acceleration has ceased and the vehicle is operating at a constant speed the weight 70 assumes the mid-position and rotation of the wheel 78 is terminated whereupon operation of the register 82 is terminated. The register then indicates the speed at which the vehicle is traveling. When the vehicle is decelerated the weight 70 moves forwardly in the direction indicated by the arrow 76 and the wheel 78 is moved to the opposite side of the disc 80 to an extent dependent upon the amount of deceleration. The wheel is therefore rotated in the opposite direction to rotate the register 82 of the indicator 81 in the opposite direction and when the deceleration terminates the wheel 78 is returned to the mid-position on the disc 80 and operation of the register 82 is terminated whereupon the instantaneous speed is indicated. When the vehicle is stopped the register will indicate zero speed.

Thus the register of the indicator 81 is operated in one direction or the other depending upon acceleration or deceleration and time for indicating instantaneous speed.

The mechanical indicator and biasing springs of Fig. 3 operate to integrate acceleration and deceleration and time for obtaining speed for accomplishing the speed indication which is accomplished by the integration of acceleration and deceleration and time with the free weight and magnetic brake of the apparatus of Fig. 1.

The arrangement of Fig. 5 works on the same principle as that of Fig. 3 but utilizes the electrical integrator 57 of Fig. 2 for indicating speed rather than the mechanical integrator of Fig. 3. The weight, disc and springs of Fig. 5 correspond to those of Fig. 3 and like reference characters have been utilized for like parts. The bridge network and electrical integrator of Fig. 5 correspond to those of Fig. 2 and like reference characters have been utilized for like parts. The bridge network of Fig. 5 is unbalanced in accordance with acceleration and deceleration for operating the electrical integrator 57 in one direction or the other and the rate of operation of the electrical integrator 57 depends upon the extent of acceleration or deceleration. The rotatable disc 59 of the integrator 57 is suitably connected as at 85 to an indicator 86 having a register 87 calibrated in speed. The results obtained by the indicator of Fig. 5 with the electrical integrator are the same as those obtained by the indicator of Fig. 3 with the mechanical integrator.

While for purposes of illustration several forms of this invention have been disclosed, other forms thereof may become apparent to those skilled in the art upon reference to this disclosure, and, therefore, this invention is to be limited only by the scope of the appended claims and prior art.

I claim as my invention:

1. A speed indicator comprising an unbiased mass adapted freely to come to rest in a plurality of positions and movable in one direction or the other only upon acceleration or deceleration, means for permitting movement of said mass from any of its positions to others of its positions during acceleration or deceleration and having means for regulating the rate of movement in accordance with only the amount of acceleration or deceleration whereby acceleration or deceleration is integrated with respect to time to position the mass in accordance with speed, and an indicator controlled by the mass for indicating speed.

2. A speed indicator comprising an unbiased mass adapted freely to come to rest in a plurality of positions and movable in one direction or the other only upon acceleration or deceleration, means including a magnetic brake for permitting movement of said mass from any of its positions to others of its positions during acceleration or deceleration and at a rate depending only upon the amount of acceleration or deceleration whereby acceleration or deceleration is integrated with respect to time to position the mass in accordance with speed, and an indicator controlled by the mass for indicating speed.

3. A speed indicator comprising an unbiased mass adapted freely to come to rest in a plurality of positions and movable in one direction or the other only upon acceleration or deceleration, means for permitting movement of said mass from any of its positions to others of its positions during acceleration or deceleration and having means for regulating the rate of movement in accordance with only the amount of acceleration or deceleration whereby acceleration or deceleration is integrated with respect to time to position the mass in accordance with speed, a bridge circuit controlled by the positioning of the mass, and an indicator controlled by the bridge circuit for indicating speed.

4. A distance indicator comprising an unbiased mass adapted freely to come to rest in a plurality of positions and movable in one direction or the other only upon acceleration or deceleration, means for permitting movement of said mass from any of its positions to others of its positions during acceleration or deceleration and having means for regulating the rate of movement in accordance with only the amount of acceleration or deceleration whereby acceleration or deceleration is integrated with respect to time to position the mass in accordance with speed, a bridge circuit controlled by the positioning of the mass, an integrator controlled by the bridge circuit for integrating speed with respect to time for obtaining distance, and an indicator operated by the integrator for indicating distance.

5. A distance indicator comprising an unbiased mass adapted freely to come to rest in a plurality of positions and movable in one direction or the other only upon acceleration or deceleration, means for permitting movement of said mass from any of its positions to others of its positions during acceleration or deceleration and having means for regulating the rate of movement in accordance with only the amount of acceleration or deceleration whereby acceleration or deceleration is integrated with respect to time to position the mass in accordance with speed, a rotating disc, a wheel positioned radially on said disc by the positioning of the mass for integrating speed with respect to time for obtaining distance, and an indicator operated by the wheel for indicating distance.

6. A distance indicator comprising an unbiased mass adapted freely to come to rest in a plurality of positions and movable in one direction or the other only upon acceleration or deceleration, means for permitting movement of said mass from any of its positions to others of its positions during acceleration or deceleration and having means for regulating the rate of movement in accordance with only the amount of acceleration or deceleration whereby acceleration or deceleration is integrated with respect to time to position the mass in accordance with speed, a time integrator controlled by the mass for integrating speed with respect to time for obtaining distance, and an indicator operated by the integrator for indicating distance.

7. A speed and distance indicator comprising an unbiased mass adapted freely to come to rest in a plurality of positions and movable in one direction or the other only upon acceleration or deceleration, means for permitting movement of said mass from any of its positions to others of its positions during acceleration or deceleration and having means for regulating the rate of movement in accordance with only the amount of acceleration or deceleration whereby acceleration or deceleration is integrated with respect to time to position the mass in accordance with speed, and an indicator controlled by the mass for indicating speed, a time integrator controlled by the mass for integrating speed with respect to time for obtaining distance, and an indicator operated by the integrator for indicating distance.

EDWARD V. SUNDT.

REFERENCES CITED

The following references are of record in the file of this patent:

UNITED STATES PATENTS

| Number | Name | Date |
|---|---|---|
| 1,280,508 | McHenry | Oct. 1, 1918 |
| 1,317,072 | Carlier | Sept. 23, 1919 |
| 1,451,923 | Pierce | Apr. 17, 1923 |
| 1,840,001 | Tsujita | Jan. 5, 1932 |
| 1,936,321 | Ambronn | Nov. 21, 1933 |
| 2,036,458 | Carlson | Apr. 7, 1936 |
| 2,193,707 | Baumann | Mar. 12, 1940 |

FOREIGN PATENTS

| Number | Country | Date |
|---|---|---|
| 124,318 | Great Britain | Mar. 27, 1919 |
| 278,237 | Germany | Sept. 24, 1914 |
| 291,867 | Germany | May 12, 1916 |